March 14, 1967 J. JANNETTO 3,309,135
PACKAGE RETAINING RACK APPARATUS
Filed Oct. 28, 1964 2 Sheets-Sheet 1
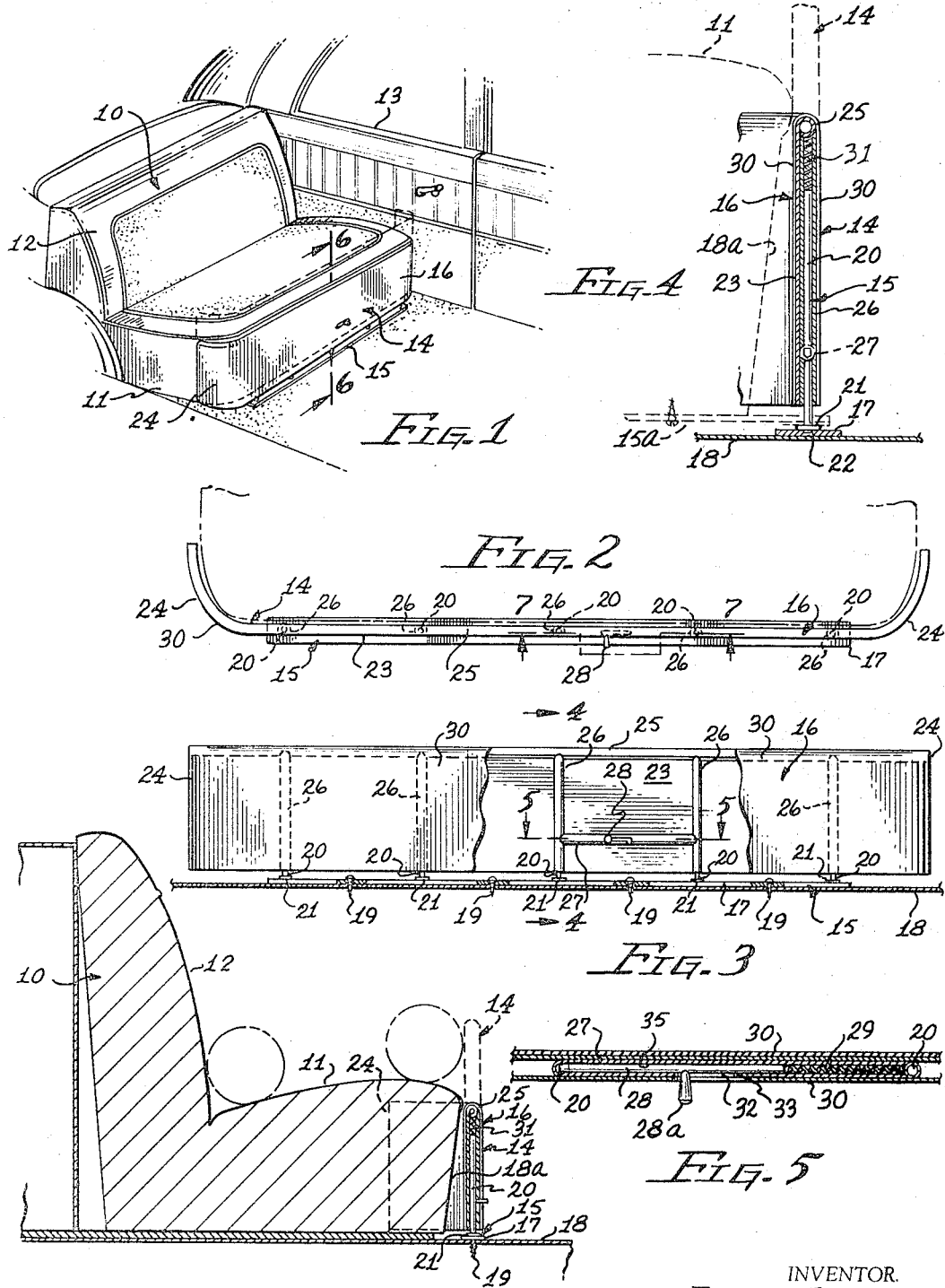
INVENTOR.
JOHN JANNETTO
BY Martin L. Stoneman
ATTORNEY.

March 14, 1967 — J. JANNETTO — 3,309,135
PACKAGE RETAINING RACK APPARATUS
Filed Oct. 28, 1964 — 2 Sheets-Sheet 2
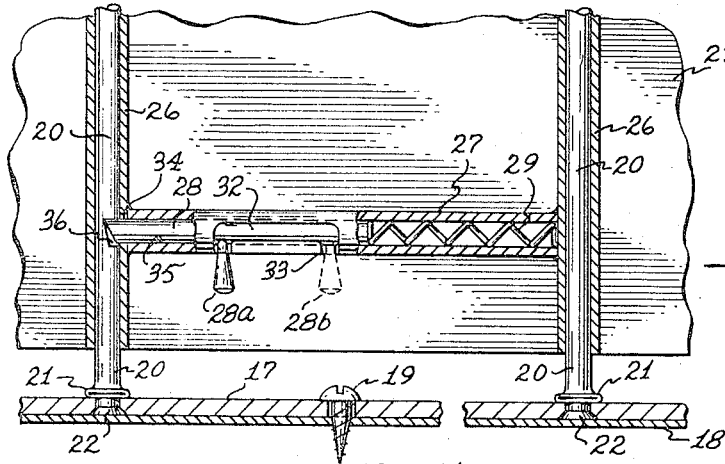
*Fig. 7*
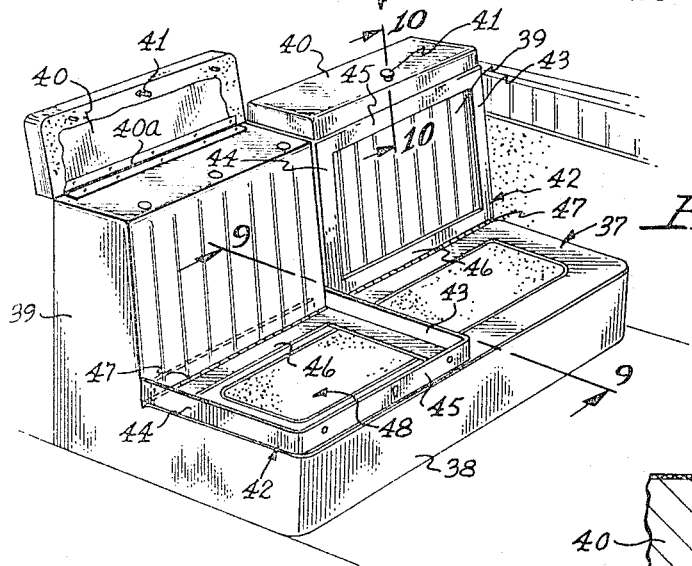
*Fig. 8*
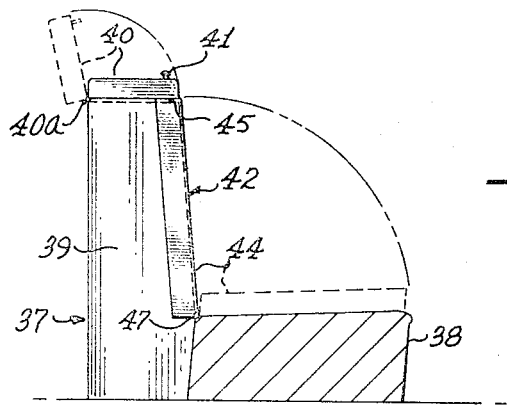
*Fig. 9*
*Fig. 10*
INVENTOR.
JOHN JANNETTO
BY
ATTORNEY.

United States Patent Office 3,309,135
Patented Mar. 14, 1967

3,309,135
PACKAGE RETAINING RACK APPARATUS
John Jannetto, 2832 La Cienega, Tucson, Ariz. 85716
Filed Oct. 28, 1964, Ser. No. 406,986
8 Claims. (Cl. 297—188)

This invention relates to a package retaining rack apparatus for use in connection with conventional automobile seats.

It is a generally known fact that the seats of the average family car are frequently used as a convenient carrying surface for packages and many articles of various size, shape and material. This practice, although frequent, is often very costly and dangerous because numerous articles may be broken or damaged when hurled or dropped to the floor by virtue of a sudden stop; and many serious accidents result from the driver's attention being diverted by attempting to prevent such dropping.

This invention provides means for safely continuing the convenient and normal practice of utilizing the automobile seat for carrying packages and articles by providing a simple, inexpensive retaining rack apparatus which, when used in association with the auto seat, will positively eliminate the costly and dangerous conditions previously attendant with such usage.

A principal object and feature of this invention is to provide a simple, inexpensive package retaining rack which may be formed to the shape of the auto seat and firmly secured to the auto body floor or to the frame of an adjustable auto seat, in close adjacent relation to the front side contour thereof, in such manner that, when not required for the specific purpose intended, the rack will be caused to remain below the top surface of the auto seat, so as not to interfere with the comfort of a passenger. But when required to serve the purpose of a package retaining rack, the rack may easily and quickly be caused to extend a sufficient distance above the top of the auto seat to provide a sturdy retaining wall which, together with the sides of the auto body or doors, forms an enclosed area defining the seat surface, upon which packages or articles may be carried with convenience and safety.

Another object and feature of this invention is to provide a semi-automatic package retaining rack for use in conjunction with conventional auto seats, which may be securely locked in its lowered non-use position below the top surface of the seat, and which rack may be quickly and automatically extended above the surface of the seat to form a suitable retaining wall in its use position by the simple manual manipulation of the locking means.

Still another object and feature of this invention is to provide a modified form of the package retaining rack which is completely manual in its operation, being suitably hinged at the intersection of the auto seat and seat back and adapted to form a retaining wall enclosure on the seat surface in its lowered use position and to be conveniently swung upwardly to its non-use position surrounding the sides and top of the seat back and locked therein by suitable means, so as not to interfere with the comfort of a passenger.

Many other objects, features and advantages of this invention will appear from the following description and drawings which are intended to form a part of this specification and in which:

FIG. 1 is a perspective view of a conventional stationary rear seat of an automobile showing the package retaining rack of the present invention associated therewith in lowered non-use position in full lines, and its upper, extended, use position, being shown in dotted lines.

FIG. 2 is a plan view of the package retaining rack assembly showing it attached to the auto body floor and illustrating the front contour of the auto seat in phantom line.

FIG. 3 is a front side elevation of the retaining rack assembly shown in FIG. 2 with the outer upholstery covering broken away to clearly illustrate the construction.

FIG. 4 is an enlarged vertical sectional view taken substantially on the line 4—4 of FIG. 3 showing in detail the rack assembly construction attached to the auto body floor in full lines and a modified construction in dotted lines which shows the rack assembly attached to a movable seat frame.

FIG. 5 is an enlarged horizontal sectional view taken on the line 5—5 of FIG. 3 showing the rack assembly hold-down means in detail.

FIG. 6 is a diagrammatical vertical sectional view taken substantially on the line 6—6 of FIG. 1 illustrating the respective relation of the package retaining rack to the front side contour and top surface of the auto seat when in its use and non-use positions.

FIG. 7 is a greatly enlarged front sectional view taken substantially on the line 7—7 of FIG. 2 with some parts in elevation and partly broken away showing the rack assembly hold-down means and attaching means in detail.

FIG. 8 is a perspective view of an auto seat of a modified form of the present invention associated with the seat in use and non-use positions.

FIG. 9 is a diagrammatical side sectional view of the seat shown in FIG. 8 illustrating the use and non-use positions of the package retaining rack assembly relative to the seat surfaces, taken substantially on the line 9—9 of FIG. 8.

FIG. 10 is an enlarged vertical sectional view taken on the line 10—10 of FIG. 8 showing the spring detent retaining means holding the package retaining rack in its non-use position.

Referring now to the various views of the drawings which illustrate the features of the present invention in great detail, and in which views, like reference numerals indicate like parts. There is shown a conventional automobile seat 10 which consists of the seat portion 11 and the back portion 12, the sides of which are normally enclosed by the body sides or doors 13.

The subject of the present invention, namely the package retaining rack assembly, is indicated in general by the reference numeral 14 and consists preferably of two subassemblies, the lower stationary supporting frame assembly 15 and the upper movable retaining wall assembly 16. The stationary supporting frame assembly 15 consists of a flat mounting plate member 17 which extends transversely over the auto body floor 18, a distance slightly less than the width of the seat portion 11 and which is preferably rigidly secured to the body floor 18, in parallel alignment with, and closely adjacent the front side face 18a of the seat portion 11, by means of suitable sheet metal screws 19 located in spaced relation along the width of the plate 17, as shown in FIGS. 2 and 3.

The lower stationary support frame assembly 15 also includes a plurality of cylindrical pins 20, which are rigidly mounted in vertical spaced relation at preferably equidistance points along the entire width of the mounting plate member 17 and are secured thereto and supported in vertical relation to said plate 17, by means of an upset integral flange portion 21, formed on the lower end of the pins 20, and by riveting, welding, or other suitable manner as indicated at 22 in FIG. 7.

It should be noted that the several views of the preferred form of the invention show the package retaining rack assembly 14 associated with a stationary rear auto seat which usually projects across the full width of the body, and the lower support frame 15 is shown attached to the body floor 18. Therefore it should be clearly understood that the present invention is applicable to, and may be associated with new type bucket seats, or any type, either full width, or divided front adjustable seats by merely attaching the lower support frame assembly 15 directly to the frame of the adjustable seat by means of screws or otherwise as clearly indicated by dotted lines in FIG. 4 at 15a.

The upper movable retaining wall assembly 16, comprises a thin gauge wall 23 which is formed to the approximate plan contour of the front side face 13a of the seat portion 11, curving inward at its outer ends 24 to completely enclose the seat, relative to the body sides or doors 13, which has its top edge rolled outwardly to form a strengthening bead 25 which extends the entire width of the wall member 23 in direct alignment with the centers of the cylindrical pins 20, which, as previously stated, are rigidly mounted in the stationary plate 17.

The upper movable retaining wall assembly 16 also includes a plurality of vertical tubular members 26 which are secured by welding or any suitable manner to the front vertical face of the wall member 23 and extend from the lower side of the bead 25 to the bottom edge of said wall member 23, as clearly indicated in FIGS. 3, 4 and 7, in direct alignment with the cylindrical support pins 20, the purpose of which will hereinafter appear. A horizontal tubular member 27 extends between any two centrally located vertical tubular members 26 and is welded or otherwise secured to the face of the wall member 23 for the purpose of retaining a spring detent plunger 28 in spring-pressed sliding relation therein by means of a spring detent plunger compression spring 29. A cover piece 30 of suitable upholstery material such as fabric or vinyl, similar to the seat upholstery, may be applied over the entire surface of the upper movable retaining wall assembly 16 to enhance the appearance of same and to prevent possible injury from rough metal edges to the passenger using the seat.

When installing the complete package retaining rack assembly 14, the lower stationary support frame assembly 15, which, as previously stated, is rigid and stationary relative to the auto seat portion 11, is firmly secured to the body floor 18 (or, in case of attachment to an ajustable seat, to the seat frame indicated at 15a) with the cylindrical pins 20 projecting vertically upward in relation to the body floor 18. At this time the upper movable retaining wall assembly 16 is held in inverted position and a compression spring 31 is inserted in the bore of each of the vertical tubular members 26. The assembly 16 is then tilted toward its final position with the vertical tubular members 26, containing the compression springs 31, in telescoping relation over the cylindrical pins 20 and allowed to drop vertically on said pins 20. Thereby said assembly 16 is completely and resiliently supported on the plurality of compression springs 31 in its raised or use position extended above the top of the auto seat portion 11 as indicated by dotted lines in FIGS. 1, 4 and 6.

When it is desired to lower the retaining wall assembly 16 to its non-use position (shown in full lines in FIGS. 1, 3, 4, 6 and 7) so as not to interfere with the seating of a passenger, it is merely necessary for the operator to retract the spring detent plunger 28, moving it to the right by means of the plunger detent knob 28a in the detent slot 32 to the position 28b, where it may be suitably locked in slot 33 against the compression of the compression spring 29, as indicated in dotted lines in FIG. 7. The operator then manually forces the retaining wall assembly 16 downwardly against the compression of springs 31 contained in the vertical tubular members 26 until an aperture 34 in the wall of the vertical tubular member 26 which is associated with the horizontal tubular member 27, comes into alignment with the bore 35 in which the spring detent plunger 28 moves laterally. At this time the operator releases the spring detent plunger 28 from the locking slot 33, thereby allowing the compression spring 29 to force the spring detent plunger 28 to the left in the bore 35 through the aperture 34 and into a slot 36 in the side of the associated cylindrical pin 20. Therefore, by said described means, assembly 16 is securely locked in its lowered non-use position below the top of the auto seat 11. To again raise the retaining wall assembly 16 to its use position (extended up above the top of the seat), it is merely necessary for the operator to release the spring detent plunger 28 from the slot 36 and the aperture 34, thereby allowing the plurality of compression springs 31 to automatically raise the retaining wall assembly 16 to its extended use position.

FIGS. 8, 9 and 10 illustrate a modified form of the present invention which is completely manual in its operation and is preferably intended for new or custom body construction in which the seats may be constructed to be directly associated with this modified form of a package retaining rack assembly, which serves exactly the same purpose as that disclosed in the preferred form previously described.

The reference numeral 37 represents the custom constructed seat in general which comprises the seat portion 38 and the back portion 39, which may be one piece or divided as shown in FIG. 8, and also includes a top cover member 40, which may cover a storage compartment if desired and provides a suitable location for a spring-loaded catch member 41 which is adapted to lock the package retainer rack assembly 42 in non-use position as shown on the left seat side in FIG. 8 and in detail in FIG. 10.

The package retainer rack assembly 42 consists of an angle section frame having the sides 43 and 44, the front 45, and the rear flat portion 46, which is hinged at 47 to the seat 37 at the intersection of the seat portion 38 and the back portion 39. In its use position, the rack assembly 42 is adapted to be flat on the surface of the seat portion 38, the angle section frame sides 43, 44, the front 45 and the seat back portion 39, forming a substantially rectangular-shaped enclosure 48 which is adapted to receive and retain packages on the top surface of the seat portion 38.

In the non-use position of the retainer rack assembly 42, as shown on the left-seat side of FIG. 8, the cover 40 which contains the spring catch member 41 is rotated about its hinge 40a, as indicated in dotted lines in FIG. 9, and the retainer rack assembly 42 is rotated about its hinge 47 to the position indicated in full lines in FIG. 9. In said non-use position, the sides 43, 44 and the front 45 are adapted to telescope the sides and top surface of the back portion 39. The cover 40 is then returned to its closed position and the spring catch 41 actuated to lock the retaining rack assembly 42 in its non-use position, where it is completely out of the way of a passenger occupying the seat.

It is therefore apparent from a study of the foregoing description in connection with the associated drawings, that a new and novel package retaining rack apparatus which may be either semi-automatic or manual in its operation has been devised, which is adapted to simply, inexpensively, and safely perform its intended function of retaining packages or articles on the seat surfaces of a moving automobile in an efficient manner.

It nevertheless should be understood that many additional modifications, features, advantages and commercial adaptations of the present invention will be evident to those skilled in the art without departing from the spirit and scope of this invention, limited only by the appended claims.

What is claimed is:

1. In combination with a passenger seat of an automobile, said passenger seat including a seat portion and a back portion: A stationary supporting frame assembly mounted in fixed relation to said seat; a movable retaining wall assembly connected in movable relation with said stationary supporting frame assembly, said movable retaining wall assembly having a first stable position adjacent and above the front and side portion of said seat portion and a second stable position such as not to impede the use of said seat for passenger seating, said movable retaining wall assembly consisting essentially of a three-sided retaining wall enclosure adapted to extend directly adjacent and above the front and sides of said seat portion of said seat in said first stable position.

2. In combination with a passenger seat of an automobile, said passenger seat including a seat portion and a back portion: A stationary supporting frame assembly mounted in fixed relation to said seat; a movable retaining wall assembly connected in movable relation with said stationary supporting frame assembly, said movable retaining wall assembly having a first stable position adjacent and above the front and side portion of said seat portion and a second stable position such as not to impede the use of said seat for passenger seating; and mechanical means for securing said movable retaining wall assembly at a desired one of said stable positions, said movable retaining wall assembly consisting essentially of a three-side retaining wall enclosure adapted to extend directly adjacent and above the front and sides of said seat portion of said seat in said first stable position.

3. In combination with a passenger seat of an automobile, said passenger seat including a seat portion and a back portion: A stationary supporting frame assembly mounted in fixed relation to said seat; a movable retaining wall assembly connected in movable relation with said stationary supporting frame assembly, said movable retaining wall assembly having a first stable position adjacent and above the front and side portion of said seat portion and a second stable position such as not to impede the use of said seat for passenger seating; and mechanical means for securing said movable retaining wall assembly at a desired one of said stable positions; said movable retaining wall assembly being constructed in such manner as to provide, when in said first stable position, a contoured wall along said front and side portions of said seat portion and extending a sufficient distance above the horizontal plane of said seat portion to act as a package retaining rack, said movable retaining wall assembly consisting essentially of a three-sided retaining wall enclosure adapted to extend directly adjacent and above the front and sides of said seat portion of said seat in said first stable position.

4. The combination of claim 3 wherein said movable retaining wall assembly is connected in vertically slideable relation with said stationary supporting frame assembly.

5. The combination of claim 3 wherein said movable retaining wall assembly is rotatably hingedly connected with said stationary supporting frame assembly.

6. In combination with a passenger seat of a vehicle, said passenger seat including a seat portion and a back portion: A stationary supporting frame assembly mounted in front of said seat portion below the horizontal plane of said seat portion; a movable retaining wall assembly connected in vertically movable relation to said stationary supporting frame assembly, said movable retaining wall assembly having a first stable position adjacent and above the front portions of said seat portion and a second stable position in front of said seat portion and below the horizontal plane of said seat portion, said movable retaining wall assembly consisting essentially of a three-sided retaining wall enclosure adapted to extend directly adjacent and above the front and sides of said seat portion of said seat in said first stable position.

7. In combination with a passenger seat of a vehicle, said passenger seat including a seat portion and a back portion: a stationary supporting frame assembly mounted in front of said seat portion below the horizontal plane of said seat portion; a movable retaining wall assembly connected in vertically movable relation to said stationary supporting frame assembly, said movable retaining wall assembly having a first stable position adjacent and above the front portions of said seat portion and a second stable position in front of said seat portion and below the horizontal plane of said seat portion; and mechanical locking means for securing said movable retaining wall assembly at a desired one of said stable positions; said movable retaining wall assembly being constructed in such manner as to provide, when in said first stable position, a contoured wall along said front and side portions of said seat portion and extending a sufficient distance above the horizontal plane of said seat portion to act as a package retaining rack, said movable retaining wall assembly consisting essentially of a three-sided retaining wall enclosure adapted to extend directly adjacent and above the front and sides of said seat portion of said seat in said first stable position.

8. In combination with a passenger seat of a vehicle, said passenger seat including a seat portion and a back portion: a stationary supporting frame assembly mounted in fixed relation to said seat and including a hinge connection located substantially at the intersection of the back portion of the said seat with the seat portion of said seat; a movable retaining wall assembly connected in hinged connection with said stationary supporting frame assembly at said hinge connection, said movable retaining wall assembly having a first stable position adjacent and above the front and side portions of said seat portion of said seat and a second stable position adjacent the back portion of said seat such as not to impede the use of said seat for passenger seating, said movable retaining wall assembly consisting essentially of a three-sided retaining wall enclosure adapted to extend directly adjacent and above the front and sides of said seat portion of said seat in said first stable position.

References Cited by the Examiner
UNITED STATES PATENTS

| | | | |
|---|---|---|---|
| 1,249,338 | 12/1917 | Crawford | 224—29 X |
| 1,959,974 | 5/1934 | Westgate | 297—390 X |
| 2,015,315 | 9/1935 | McMackin | 312—315 X |
| 2,048,955 | 7/1936 | Showalter | 5—331 X |
| 2,284,811 | 6/1942 | Ferrelle | 297—191 X |
| 2,478,028 | 8/1949 | Travis | 5—331 X |
| 2,532,007 | 11/1950 | Biasell | 297—390 X |
| 2,791,269 | 5/1957 | Buell et al. | 297—390 X |
| 2,822,968 | 2/1958 | Jackson | 224—29.4 |
| 2,853,719 | 9/1958 | Levin | 5—331 X |
| 3,094,354 | 6/1963 | Bernier | 297—191 X |
| 3,104,041 | 9/1963 | Craig et al. | 224—29 |

FRANK B. SHERRY, *Primary Examiner.*

JAMES T. McCALL, *Examiner.*